(12) United States Patent
Yoshida et al.

(10) Patent No.: US 12,328,011 B2
(45) Date of Patent: Jun. 10, 2025

(54) COIL COMPONENT AND WIRELESS POWER TRANSMISSION DEVICE HAVING THE SAME

(71) Applicant: TDK Corporation, Tokyo (JP)

(72) Inventors: Takuya Yoshida, Tokyo (JP); Noritaka Chiyo, Tokyo (JP); Michihisa Tokui, Tokyo (JP); Kentaro Kamiyama, Tokyo (JP); Daiki Yamane, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 18/164,723

(22) Filed: Feb. 6, 2023

(65) Prior Publication Data
US 2023/0253830 A1    Aug. 10, 2023

(30) Foreign Application Priority Data
Feb. 7, 2022    (JP) .................................. 2022-016845

(51) Int. Cl.
| H01F 27/28 | (2006.01) |
| H01F 17/00 | (2006.01) |
| H01F 27/00 | (2006.01) |
| H02J 50/12 | (2016.01) |

(52) U.S. Cl.
CPC .......... H02J 50/12 (2016.02); H01F 17/0006 (2013.01); H01F 27/006 (2013.01); H01F 27/2871 (2013.01); H01F 2017/0073 (2013.01)

(58) Field of Classification Search
CPC .... H01F 27/006; H01F 27/28; H01F 27/2804; H01F 27/2871; H01F 38/14; H01F 2017/0073; H02J 50/10; H02J 50/12
See application file for complete search history.

(56) References Cited

U.S. PATENT DOCUMENTS

| 2002/0057171 | A1* | 5/2002 | Patel | H01F 27/2804 336/200 |
| 2003/0179067 | A1* | 9/2003 | Gamou | H01F 27/2804 336/223 |
| 2009/0289750 | A1* | 11/2009 | Ohsawa | H01F 38/08 336/192 |
| 2014/0104133 | A1* | 4/2014 | Finn | G06K 19/07769 343/866 |
| 2014/0152118 | A1* | 6/2014 | Kim | H01F 27/2847 307/104 |
| 2015/0130291 | A1 | 5/2015 | Lim et al. | |
| 2015/0235755 | A1* | 8/2015 | Ozaki | H01F 27/2847 336/200 |
| 2015/0280445 | A1 | 10/2015 | Yamakawa et al. | |
| 2016/0241061 | A1 | 8/2016 | Werner et al. | |
| 2019/0304670 | A1* | 10/2019 | Chiyo | H01F 27/2804 |
| 2020/0274392 | A1 | 8/2020 | Chiyo et al. | |

(Continued)

FOREIGN PATENT DOCUMENTS

| JP | 07-037728 A | 2/1995 |
| JP | 2003-109830 A | 4/2003 |

(Continued)

*Primary Examiner* — Levi Gannon
(74) *Attorney, Agent, or Firm* — Rimon P.C.

(57) ABSTRACT

Disclosed herein is a coil component that includes a substrate, and a planar spiral coil pattern provided on the surface of the substrate. The coil pattern has a circularity higher in its inner shape than in its outer shape.

12 Claims, 15 Drawing Sheets

(56) References Cited

U.S. PATENT DOCUMENTS

| | | | |
|---|---|---|---|
| 2021/0100104 A1* | 4/2021 | Sung | H01F 17/0013 |
| 2021/0151250 A1* | 5/2021 | Zhu | H01F 27/2804 |
| 2021/0272738 A1 | 9/2021 | Chiyo et al. | |
| 2023/0016466 A1* | 1/2023 | Berggren | H02J 50/60 |

FOREIGN PATENT DOCUMENTS

| | | |
|---|---|---|
| JP | 2014-093795 A | 5/2014 |
| JP | 2018-510599 A | 4/2018 |
| JP | 2020-141030 A | 9/2020 |
| JP | 2021-141098 A | 9/2021 |

* cited by examiner

COIL COMPONENT AND WIRELESS POWER TRANSMISSION DEVICE HAVING THE SAME

CROSS-REFERENCE TO RELATED APPLICATION

This application claims the benefit of Japanese Patent Application No. 2022-016845, filed on Feb. 7, 2022, the entire disclosure of which is incorporated by reference herein.

BACKGROUND

The present disclosure relates to a coil component and a wireless power transmission device having the coil component.

JP 2014-093795A discloses a wireless power transmission device provided with a coil component having a width larger than the height thereof. When the coil component having such a shape is used as a power transmission coil, power transmission can be performed efficiently even with displacement of the position of a power reception coil in the width direction.

However, the coil component described in JP 2014-093795A has a problem in that a difference in magnetic field strength among peripheral direction positions is large in an opening area where a magnetic field becomes strongest.

SUMMARY

A coil component according to one embodiment of the present disclosure includes a substrate, and a planar spiral coil pattern provided on the surface of the substrate. The coil pattern has a circularity higher in its inner shape than in its outer shape.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

An object of the present disclosure to provide a coil component in which a magnetic field can be formed in a wide range, and a difference in magnetic field strength among the peripheral direction positions of the opening area is small.

Preferred embodiments of the present disclosure will be explained below in detail with reference to the accompanying drawings.

Figure 1:
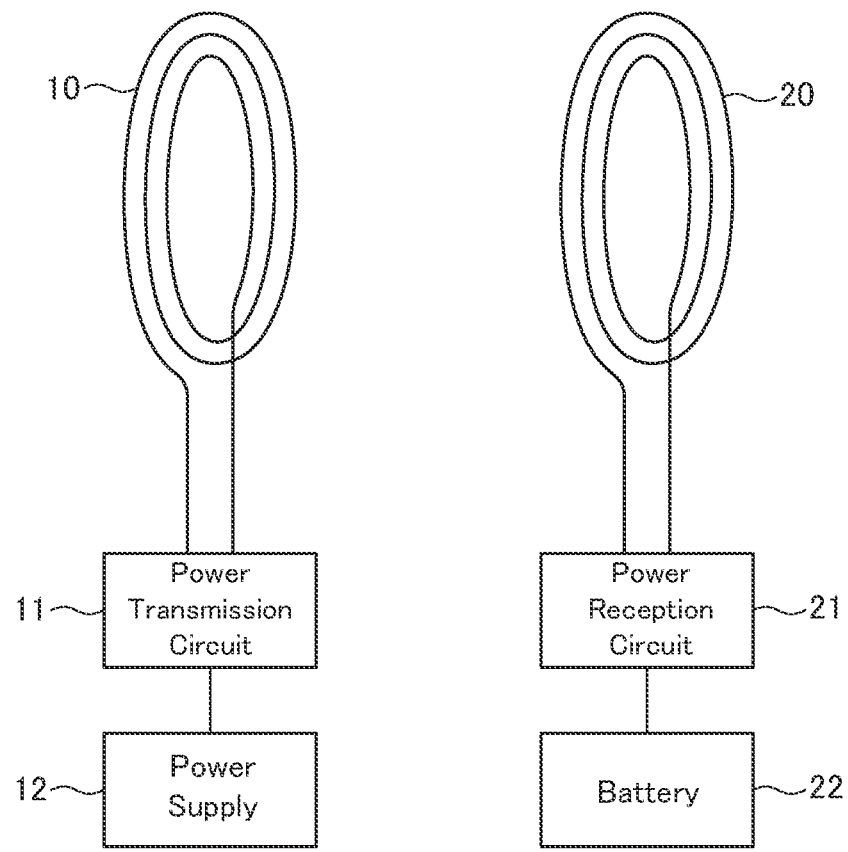
FIG. 1 is a schematic view for explaining the configuration of a wireless power transmission device according to an embodiment of the present disclosure.

FIG. 1 is a schematic view for explaining the configuration of a wireless power transmission device according to an embodiment of the present disclosure.

The wireless power transmission device illustrated in FIG. 1 includes a power transmission coil 10 and a power reception coil 20 which are magnetically coupled to each other, a power transmission circuit 11 connected to the power transmission coil 10, and a power reception circuit 21 connected to the power reception coil 20. The power transmission circuit 11 is connected to a power supply 12, and the power reception circuit 21 is connected to a battery 22. The power reception coil 20, power reception circuit 21, and battery 22 are incorporated in a mobile terminal such as a smartphone. The power transmission coil 10, power transmission circuit 11, and power supply 12 are incorporated in equipment in which a mobile terminal is placed, such as a center console provided in the interior of an automobile. The relative position between the power transmission coil 10 and the power reception coil 20 varies depending on the position at which the mobile phone is placed, so that the power transmission coil 10 is required to form a magnetic field in a wide range so as to adequately transmit power irrespective of the placing position of the mobile phone.

Figure 2:
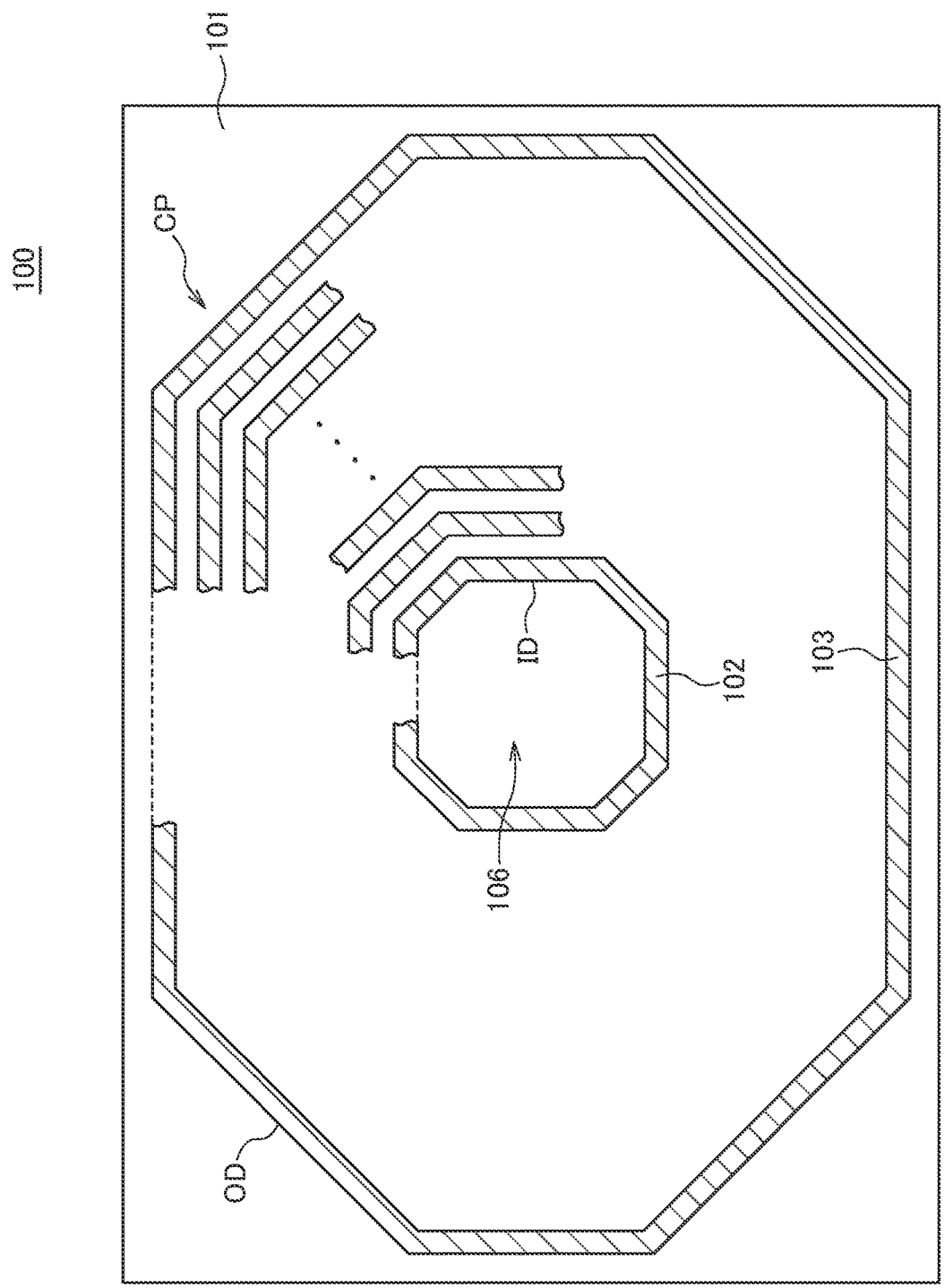
FIG. 2 is a schematic view for explaining the basic configuration of a coil component 100 suitably used as the power transmission coil 10.

FIG. 2 is a schematic view for explaining the basic configuration of a coil component 100 suitably used as the power transmission coil 10.

As illustrated in FIG. 2, the coil component 100 includes a substrate 101 made of a PET film and a planar spiral coil pattern CP provided on the surface of the substrate 101. The coil pattern CP is constituted by a conductor pattern wound in a plurality of turns. An inner shape ID is defined by a line segment along the inner peripheral side edge of a conductor pattern 102 positioned at the innermost periphery, and an outer shape OD is defined by a line segment along the outer peripheral side edge of a conductor pattern 103 positioned at the outermost periphery. The inner shape ID and outer shape OD are both a closed line segment.

Figure 3A:
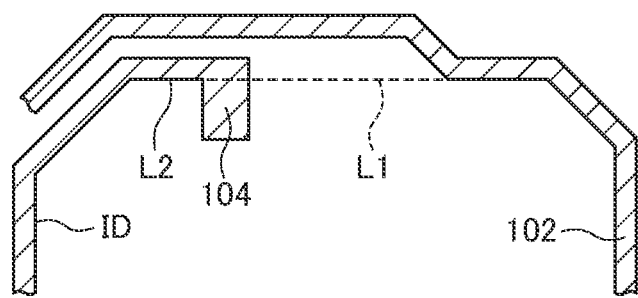
FIG. 3A is a schematic diagram for explaining a definition of the inner shape ID.
Figure 3B:
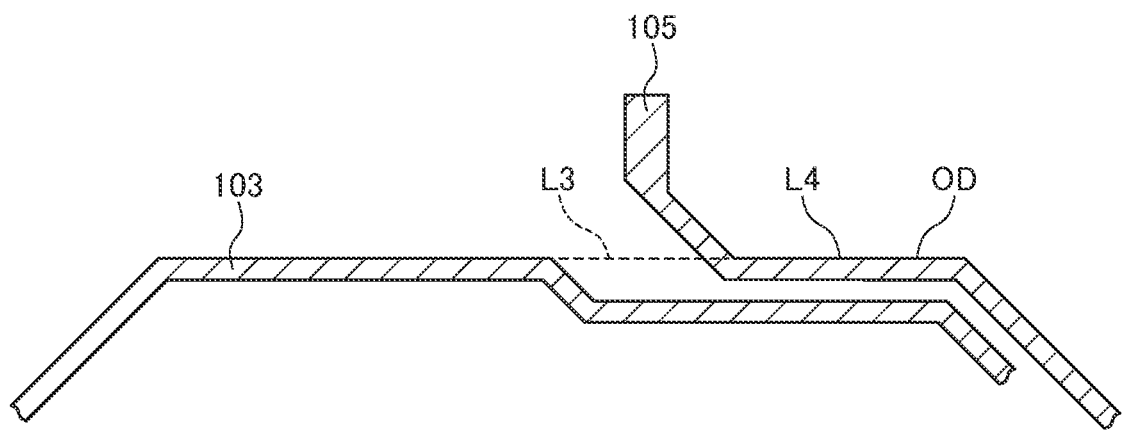
FIG. 3B is a schematic diagram for explaining a definition of the outer shape OD.

The innermost conductor pattern 102 terminates at the inner peripheral end, so that, as illustrated in FIG. 3A, the inner shape ID includes a virtual line L1. The virtual line L1 is a straight line obtained by extending a line segment L2, which extends along the inner peripheral side edge of the conductor pattern 102 from the outer periphery to inner periphery, beyond the inner peripheral end 104 and up to the conductor pattern 102 existing at a position beyond the inner peripheral end 104. Similarly, the outermost conductor pattern 103 terminates at an outer peripheral end 105, so that, as illustrated in FIG. 3B, the outer shape OD includes a virtual line L3. The virtual line L3 is a straight line obtained by extending a line segment L4, which extends along the outer peripheral side edge of the conductor pattern 103 from the inner periphery to outer periphery, beyond the outer peripheral end 105 and up to the conductor pattern 103 existing at a position beyond the outer peripheral end 105.

Figure 4:
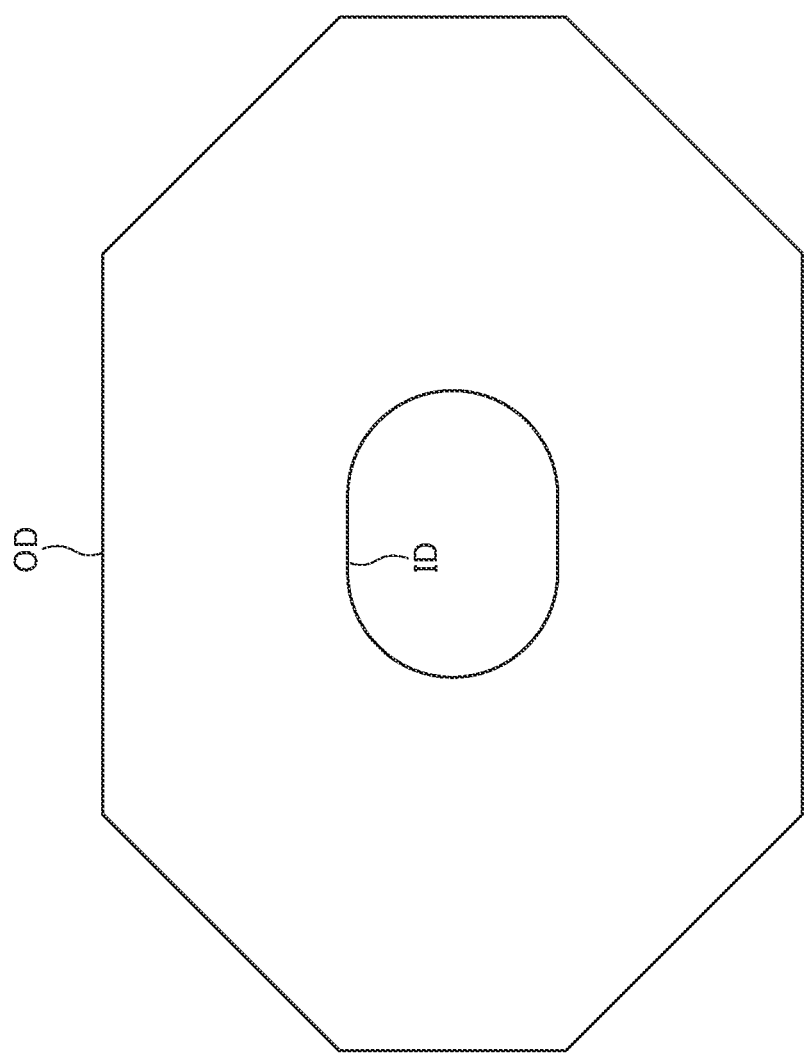
FIG. 4 is a schematic diagram indicating an example in which the corner portions of the inner shape ID is gently curved.

The circularity of the inner shape ID of the coil pattern CP is higher than the circularity of the outer shape OD of the coil pattern CP. The circularity is defined by $4S\pi/L^2$ assuming that the area of the closed line segment (graphic) is S and that the peripheral length is L, and the closer to 1 the circularity is, the closer to a true circle a target shape becomes. In the present embodiment, the inner shape ID has a high circularity, so that uniformity of a magnetic field that passes through an opening area 106 (area surrounded by the innermost conductor pattern 102) of the coil pattern CP in the peripheral direction is enhanced. Thus, when the coil component 100 is used as the power transmission coil 10 illustrated in FIG. 1, magnetic coupling between the power transmission coil 10 and the power reception coil 20 in the absence of displacement of the relative position therebetween is enhanced. To further increase the circularity of the inner shape ID, the corner portions of the inner shape ID may be gently curved, as illustrated in FIG. 4.

On the other hand, the outer shape OD has a low circularity in the present embodiment, a magnetic field can be expanded to a desired range unlike when the outer shape OD is close to a true circle. As a result, when the coil component 100 is used as the power transmission coil 10 illustrated in FIG. 1, magnetic coupling can be achieved even with displacement of the relative position between the power transmission coil 10 and the power reception coil 20. However, when the circularity of the outer shape OD is excessively low, uniformity of magnetic field distribution outside the coil pattern CP significantly deteriorates, so that the circularity of the outer shape OD may be higher than the circularity (=0.785) of a square.

The following describes, more specifically, the pattern shape of the coil pattern CP.

Figure 5:
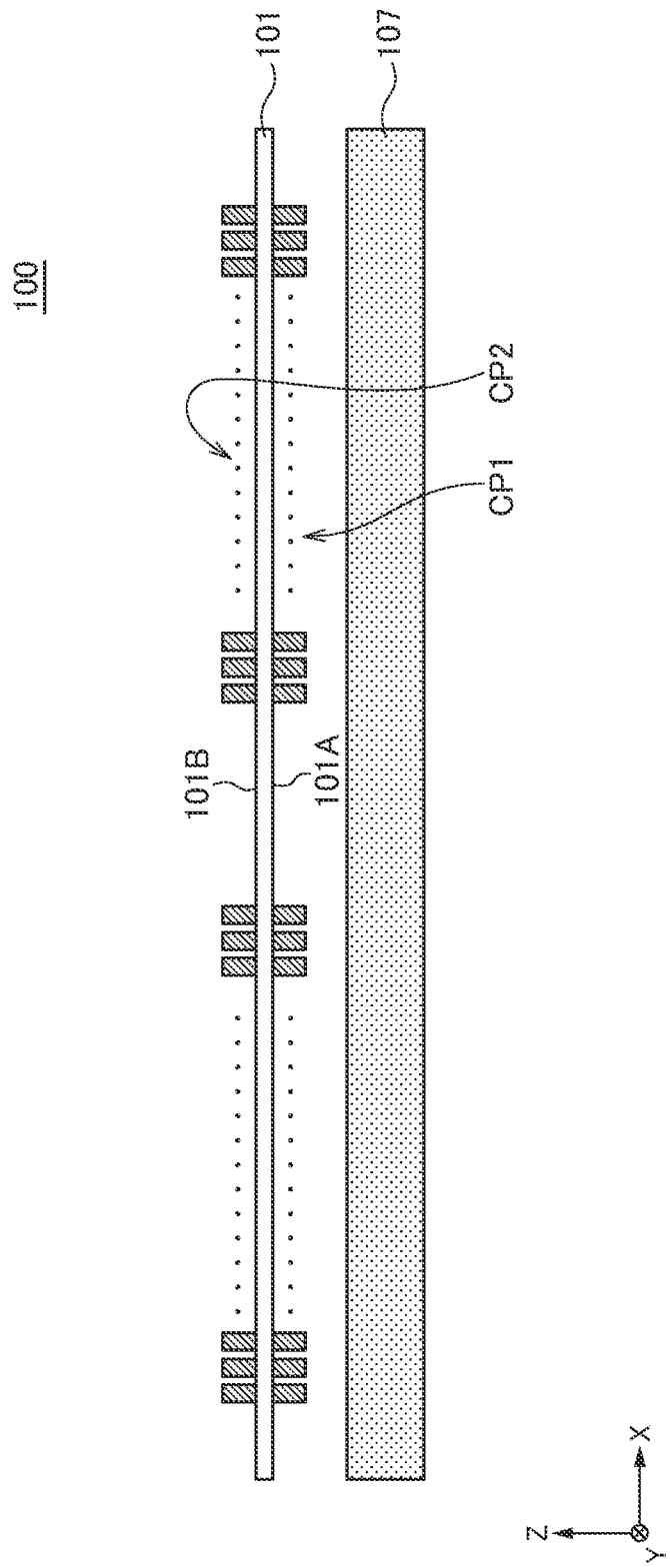
FIG. 5 is a schematic cross-sectional view for explaining the structure of the coil component 100 according to an embodiment.

FIG. 5 is a schematic cross-sectional view for explaining the structure of the coil component 100 according to an embodiment.

The coil component 100 illustrated in FIG. 5 includes a first coil pattern CP1 provided on one surface 101A of the substrate 101 and a second coil pattern CP2 provided on the other surface 101B of the substrate 101. When the coil component 100 is used as the power transmission coil 10 illustrated in FIG. 1, it may be covered with a magnetic sheet 107 from one side in the axial direction thereof. In this case, the power reception coil 20 is positioned on the opposite side of the magnetic sheet 107 with respect to the power transmission coil 10.

Figure 6:
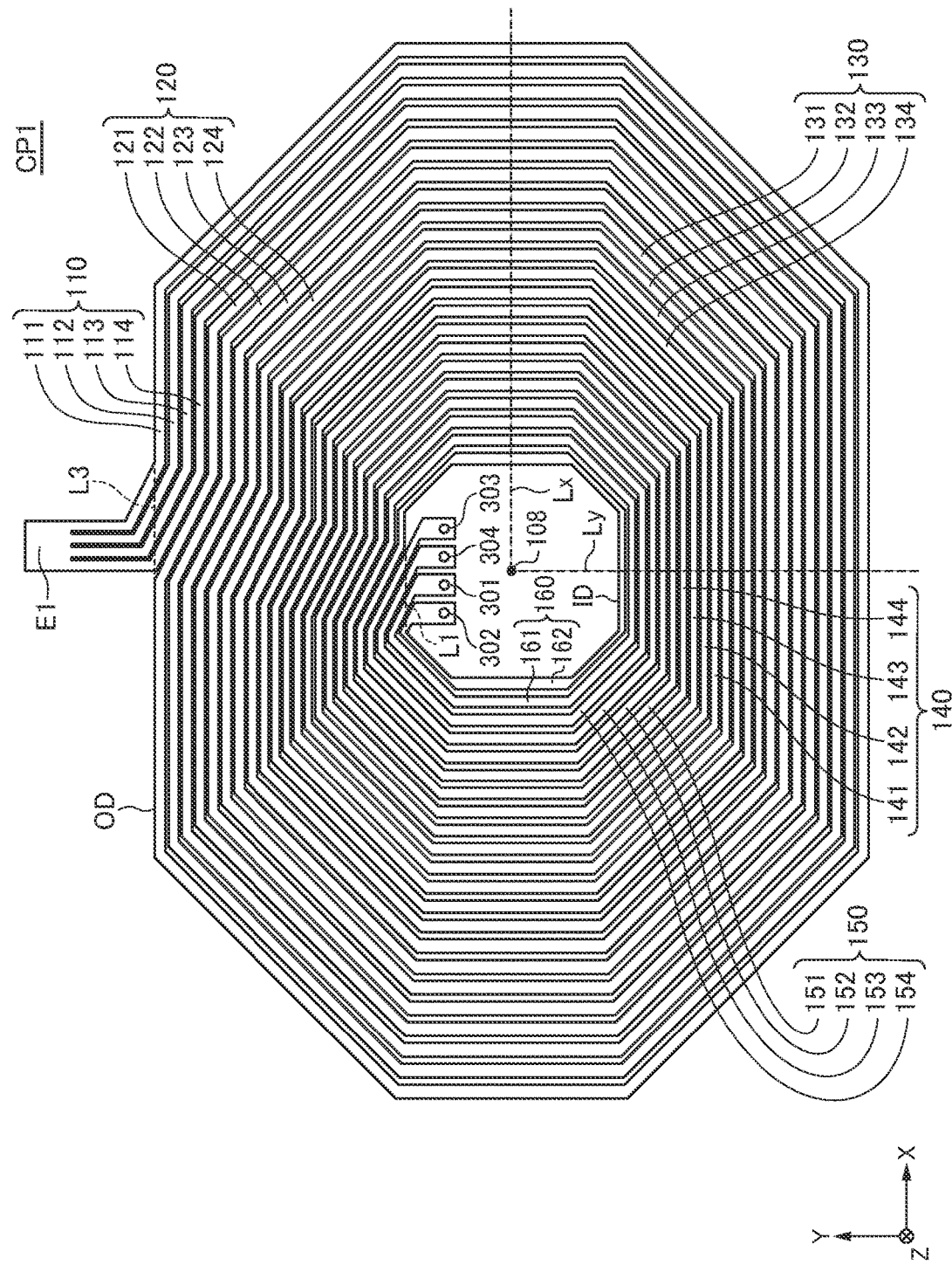
FIG. 6 is a schematic plan view illustrating the pattern shape of the first coil pattern CP1.

FIG. 6 is a schematic plan view illustrating the pattern shape of the first coil pattern CP1.

As illustrated in FIG. 6, the first coil pattern CP1 has a six-turn configuration constituted of turns 110, 120, 130, 140, 150, and 160, in which the turn 110 and the turn 160 are positioned at the outermost periphery and at the innermost periphery, respectively. The turns 110, 120, 130, 140, and 150 are each radially divided into four by three spiral slits. The turn 160 is radially divided into two by one spiral slit. Specifically, the turn 110 is divided into four lines 111 to 114, the turn 120 is divided into four lines 121 to 124, the turn 130 is divided into four lines 131 to 134, the turn 140 is divided into four lines 141 to 144, the turn 150 is divided into four lines 151 to 154, and the turn 160 is divided into two lines 161 and 162.

The lines 111, 121, 131, 141, 151, and 161 are continuous lines spirally wound in six turns and are each positioned at the outermost periphery in its corresponding turn. The lines 112, 122, 132, 142, 152, and 162 are continuous lines spirally wound in six turns and are each the second line counted from the outermost peripheral line in its corresponding turn. The lines 113, 123, 133, 143, and 153 are continuous lines spirally wound in five turns and are each the second line counted from the innermost peripheral line in its corresponding turn. The lines 114, 124, 134, 144, and 154 are continuous lines spirally wound in five turns and are each positioned at the innermost periphery in its corresponding turn.

The outer peripheral ends of the lines 111 to 114 are connected in common to a first terminal electrode E1. The inner peripheral ends of the lines 161, 162, 153, and 154 are connected respectively to through hole conductors 301 to 304 penetrating the substrate 101.

The inner shape ID and outer shape OD of the first coil pattern CP1 are each an octagon, and the inner angles of the corner portions included in the inner and outer shapes ID and OD are all less than 180°. The outer shape OD of the first coil pattern CP1 is larger in size in the X-direction (first direction) than in the Y-direction (second direction), while the inner shape ID of the first coil pattern CP1 has the substantially the same size in the X- and Y-directions. As a result, the circularity of the inner shape ID of the first coil pattern CP1 is higher than the circularity of the outer shape OD of the first coil pattern CP1.

Figure 7:
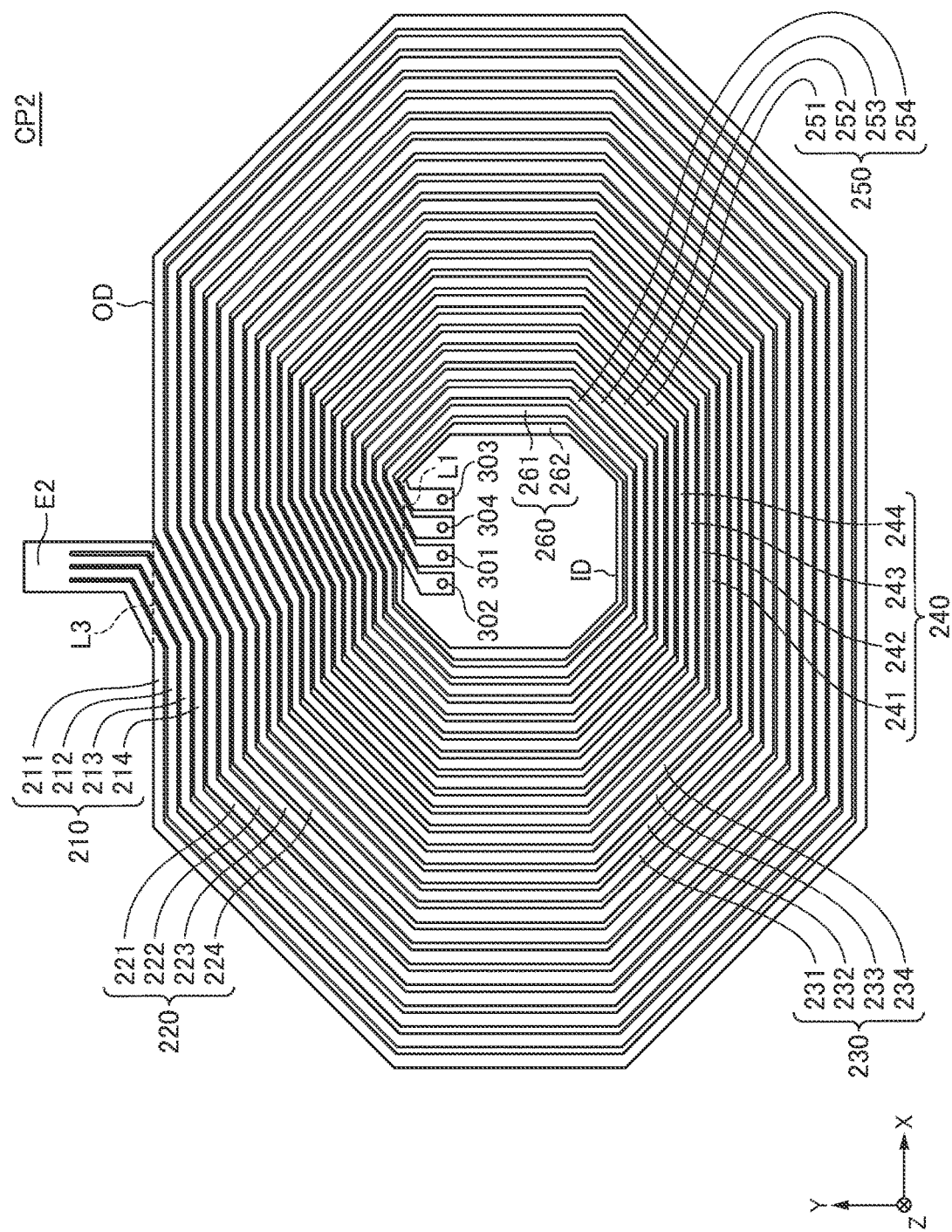
FIG. 7 is a schematic plan view illustrating the pattern shape of the second coil pattern CP2.

FIG. 7 is a schematic plan view of the pattern shape of the second coil pattern CP2, which illustrates a state viewed from the surface 101A side of the substrate 101 transparently through the substrate 101.

The second coil pattern CP2 has the same pattern shape as that of the first coil pattern CP1. However, the second coil pattern CP2 need not completely be the same in shape as the first coil pattern CP1, and a difference in size due to manufacturing error or manufacturing convenience can be ignored. The second coil pattern CP2 has a six-turn configuration constituted of turns 210, 220, 230, 240, 250, and 260, in which the turn 210 and the turn 260 are positioned at the outermost periphery and at the innermost periphery, respectively. The turns 210, 220, 230, 240, and 250 are each radially divided into four by three spiral slits. The turn 260 is radially divided into two by one spiral slit. Specifically, the turn 210 is divided into four lines 211 to 214, the turn 220 is divided into four lines 221 to 224, the turn 230 is divided into four lines 231 to 234, the turn 240 is divided into four lines 241 to 244, the turn 250 is divided into four lines 251 to 254, and the turn 260 is divided into two lines 261 and 262.

The lines 211, 221, 231, 241, 251, and 261 are continuous lines spirally wound in six turns and are each positioned at the outermost periphery in its corresponding turn. The lines 212, 222, 232, 242, 252, and 262 are continuous lines spirally wound in six turns and are each the second line counted from the outermost peripheral line in its corresponding turn. The lines 213, 223, 233, 243, and 253 are continuous lines spirally wound in five turns and are each the second line counted from the innermost peripheral line in its corresponding turn. The lines 214, 224, 234, 244, and 254 are continuous lines spirally wound in five turns and are each positioned at the innermost periphery in its corresponding turn.

The outer peripheral ends of the lines 211 to 214 are connected in common to a second terminal electrode E2. The inner peripheral ends of the lines 261, 262, 253, and 254 are connected respectively to the through hole conductors 304, 303, 302, and 301. As a result, four lines each having 11 turns are connected in parallel between the first and second terminal electrodes E1 and E2. The second terminal electrode E2 may be provided on the surface 101A of the substrate 101. In this case, the outer peripheral ends of the lines 211 to 214 provided on the surface 101B of the substrate 101 are connected to the second terminal electrode E2 provided on the surface 101A of the substrate 101 through hole conductors penetrating the substrate 101.

Figure 8:
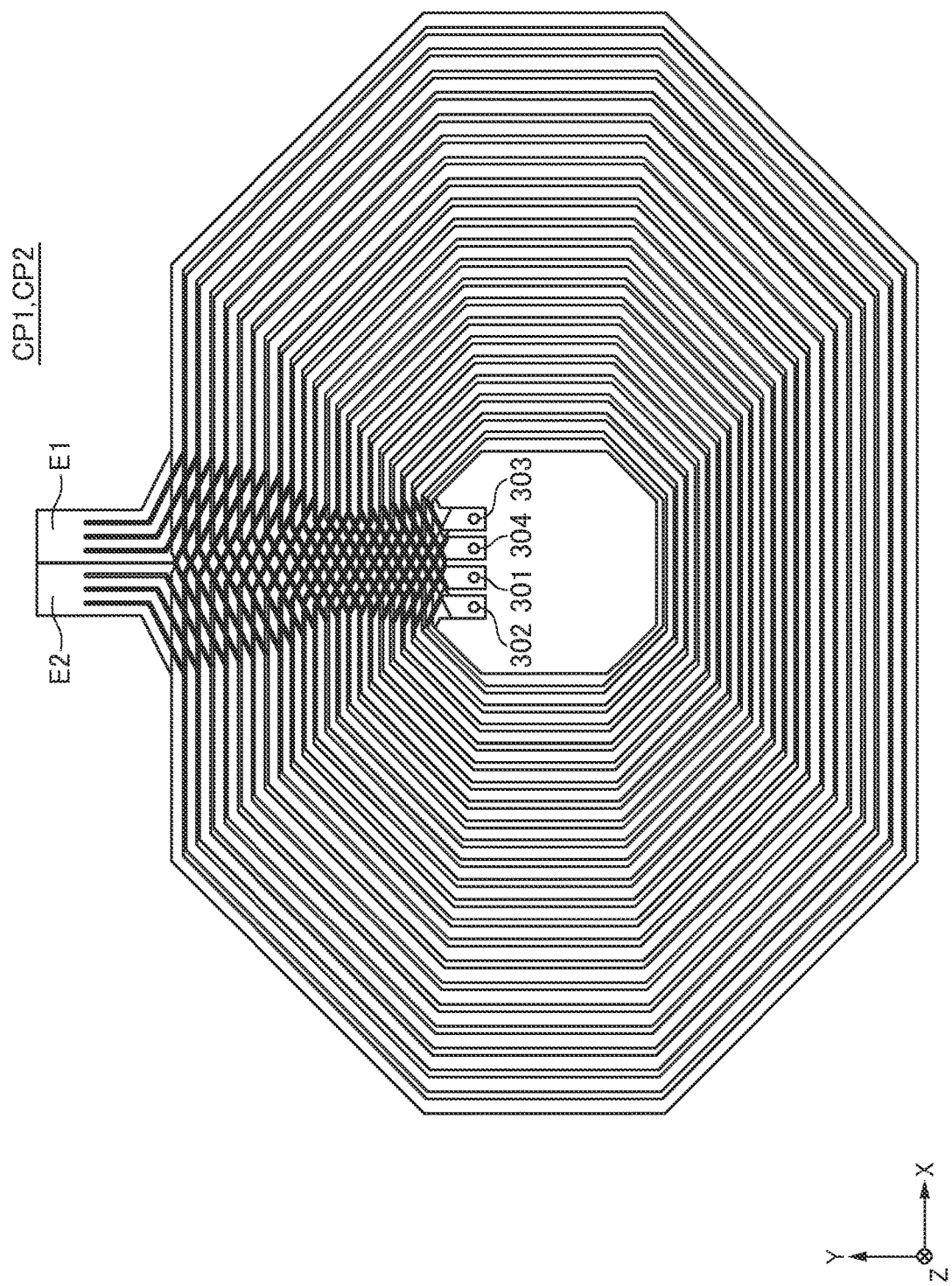
FIG. 8 is a schematic plan view illustrating a state where the first and second coil patterns CP1 and CP2 are made to overlap as viewed from the surface 101A side of the substrate 101.

FIG. 8 is a schematic plan view illustrating a state where the first and second coil patterns CP1 and CP2 are made to overlap as viewed from the surface 101A side of the substrate 101.

As illustrated in FIG. 8, the planar positions of the lines constituting the first coil pattern CP1 and the lines constituting the second coil pattern CP2 are substantially the same except for a transition area positioned between the first and second terminal electrodes E1, E2 and the through hole conductors 301 to 304. Further, the first and second terminal electrodes E1 and E2 are disposed adjacent to each other in the X-direction, facilitating connection thereof to the power transmission circuit 11 illustrated in FIG. 1.

Figure 9:
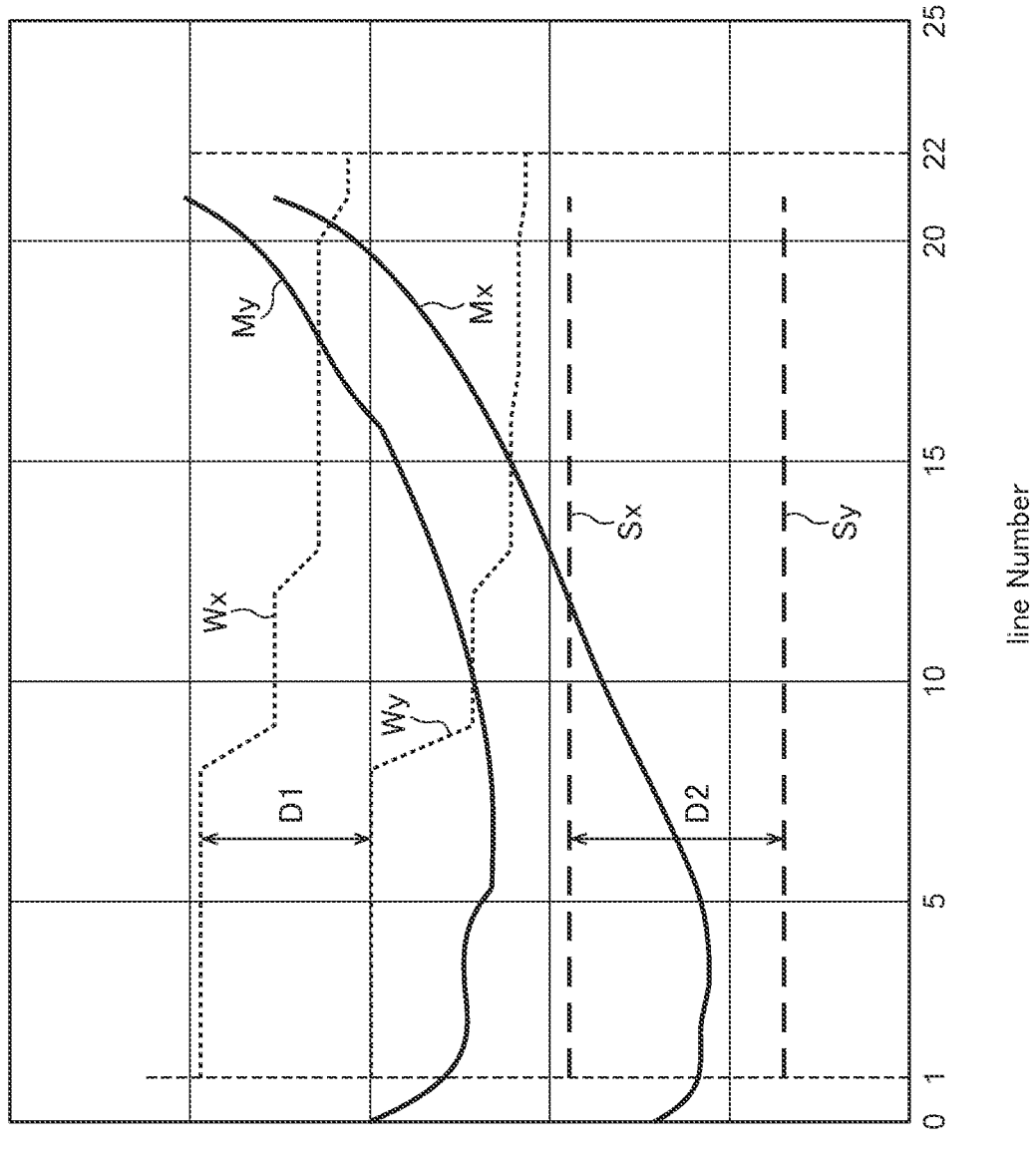
FIG. 9 is a graph for explaining the line width of the lines constituting the first coil pattern CP1 and the space width between the lines.

FIG. 9 is a graph for explaining the line width of the lines constituting the first coil pattern CP1 and the space width between the lines.

As described above, the first coil pattern CP1 is constituted of the turns 110, 120, 130, 140, and 150 each having four lines and the turn 160 having two lines. Thus, as illustrated in FIG. 6, assuming that virtual lines Lx and Ly extend respectively in the X- and Y-directions from a center point 108 of the first coil pattern CP1, they both cross 22 lines. In FIG. 9, there are illustrated a line width Wx of the lines crossing the virtual line Lx, a space width Sx therebetween, and a magnetic field strength Mx thereon, and a line width Wy of the lines crossing the virtual line Ly, a space width Sy therebetween, and a magnetic field strength My thereon. In this graph, the line number of the outermost line 111 is defined as "1", and the line number of the innermost line 162 is defined as "22". The space widths Sx and Sy are each defined by the space width between a target line and a line adjacent to the inner peripheral side of the target line.

As illustrated in FIG. 9, for the radially arranged 22 lines, the line widths Wx and Wy increases from the inner periphery to outer periphery at both a first position crossing the virtual line Lx and a second position crossing the virtual lines Ly. The increase in the line widths Wx and Wy from the inner periphery to outer periphery is stepwise. Specifically, the increase changes in four steps at the first position crossing the virtual line Lx and in five steps at the second position crossing the virtual line Ly. That is, the number of steps that the line width Wy increases at the second position is larger than the number of steps that the line width Wx increases at the first position. The reason that the line widths Wx and Wy are made to increase from the inner periphery to outer periphery is as follows: as illustrated in FIG. 9, the magnetic field strength is highest on the innermost line and decreases from the innermost line toward the outer periphery, so that it is necessary to reduce a loss by reducing the line width at a portion where the magnetic field strength is high and to reduce a DC resistance by increasing the line width at a portion where the magnetic field strength is low. Further, the reason that the number of steps that the line width Wy increases at the second position crossing the virtual line Ly is as follows: the outer shape OD of the first coil pattern CP1 is larger in size in the X-direction than in the Y-direction, whereby, in the same turn, the magnetic field strength is higher at the second position crossing the virtual line Ly than at the first position crossing the virtual line Lx, so that it is necessary to finely adjust the relation between a loss and a DC resistance by increasing the number of steps that the line width Wy increases.

The outer shape OD of the first coil pattern CP1 is larger in size in the X-direction than in the Y-direction as described above, and accordingly, in each turn, the line width Wx at the first position crossing the first virtual line Lx is larger than the line width Wy at the second position crossing the second virtual line Ly. Thus, the space width Sx at a third position crossing the first virtual line Lx can be made constant in the radial direction, and the space width Sy at a fourth position crossing the second virtual line Ly can be made constant in the radial direction. Further, the space width Sx at the third position crossing the first virtual line Lx is larger than the space width Sy at the fourth position crossing the second virtual line Ly. This prevents the line width Wx at the first position crossing the virtual line Lx from increasing excessively to thereby make it possible to suppress a loss at the first position. Further, in each turn of the coil pattern CP1, a difference D1 between the line width Wx at the first position and the line width Wy at the second position is smaller than a difference D2 between the space width Sx at the third position adjacent to the first position and the space width Sy at the fourth position adjacent to the second position. This can prevent an extreme variation in the line width in the same turn, thereby making it possible to reduce a DC resistance.

While the pattern shape of the first coil pattern CP1 has thus been described, the second coil pattern CP2 has the same pattern shape. Thus, the coil component 100 according to the present embodiment has the first and second coil patterns CP1 and CP2, and the inner shape ID thereof is higher in circularity than the outer shape OD, so that it is possible to enhance peripheral uniformity of a magnetic field on the innermost turns 160 and 260 and to form a magnetic field in a wide range, especially, in the X-direction.

Figure 10:
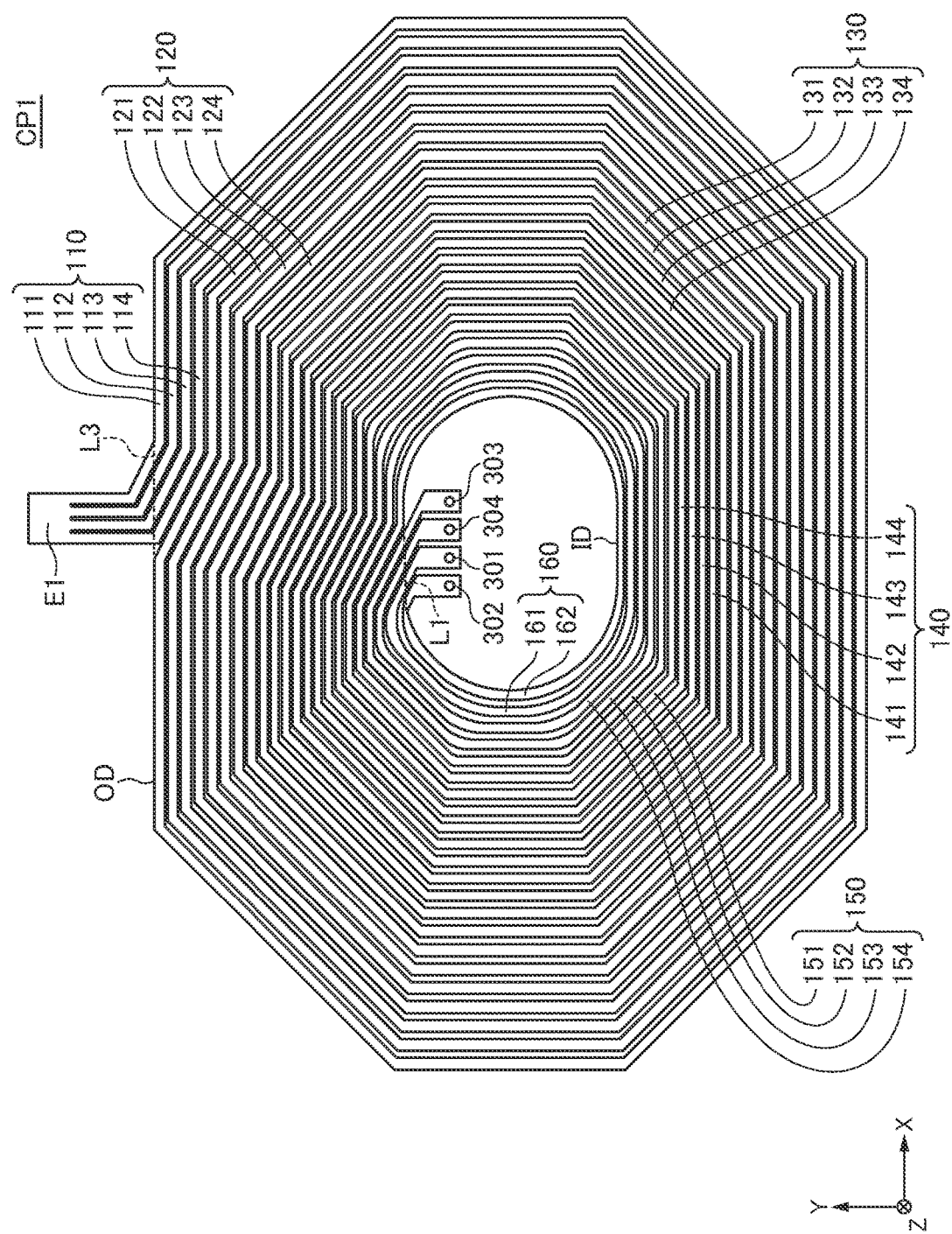
FIG. 10 is a schematic plan view illustrating the pattern shape of the first coil pattern CP1 according to a first modification.
Figure 11:
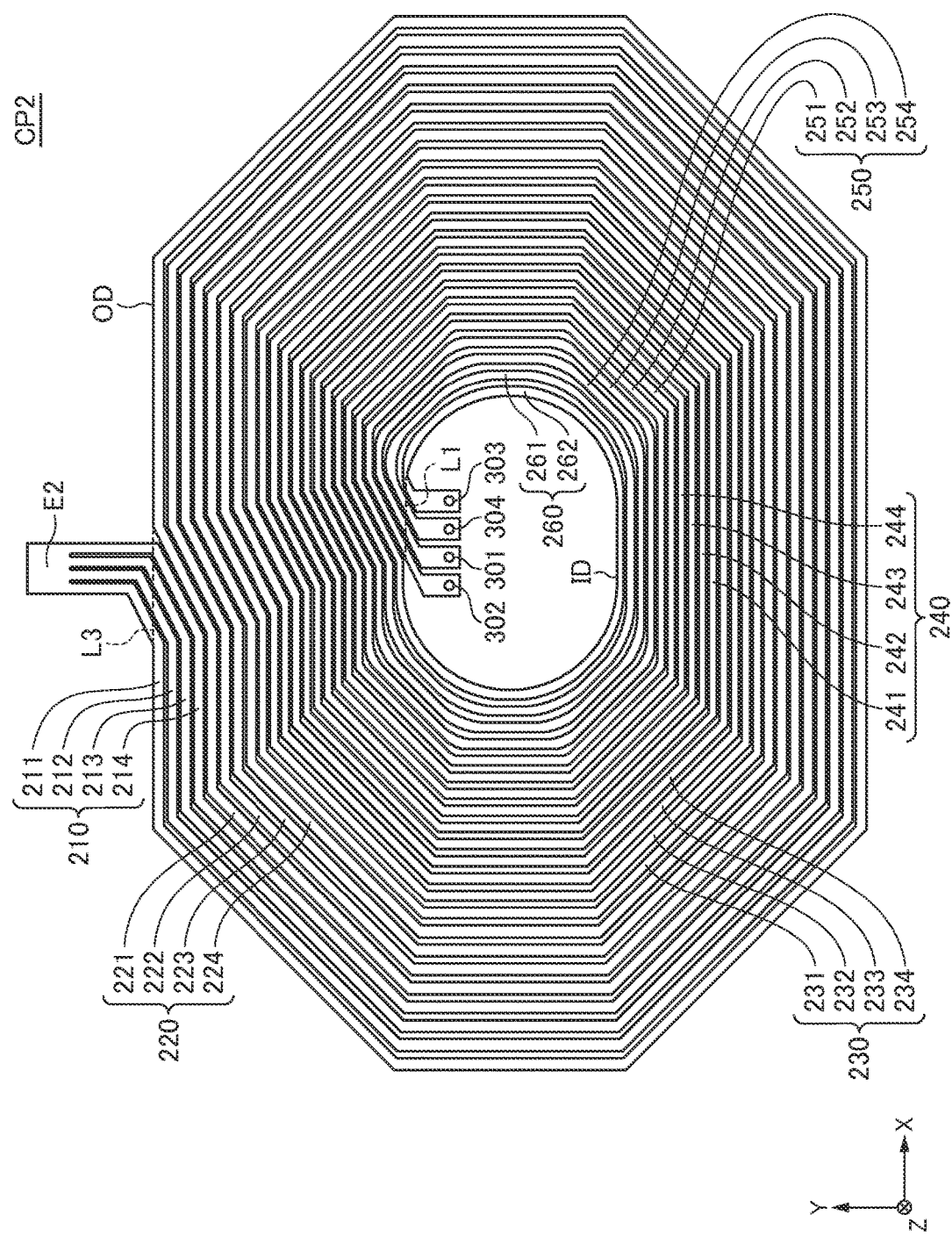
FIG. 11 is a schematic plan view illustrating the pattern shape of the second coil pattern CP2 according to the first modification.
Figure 12:
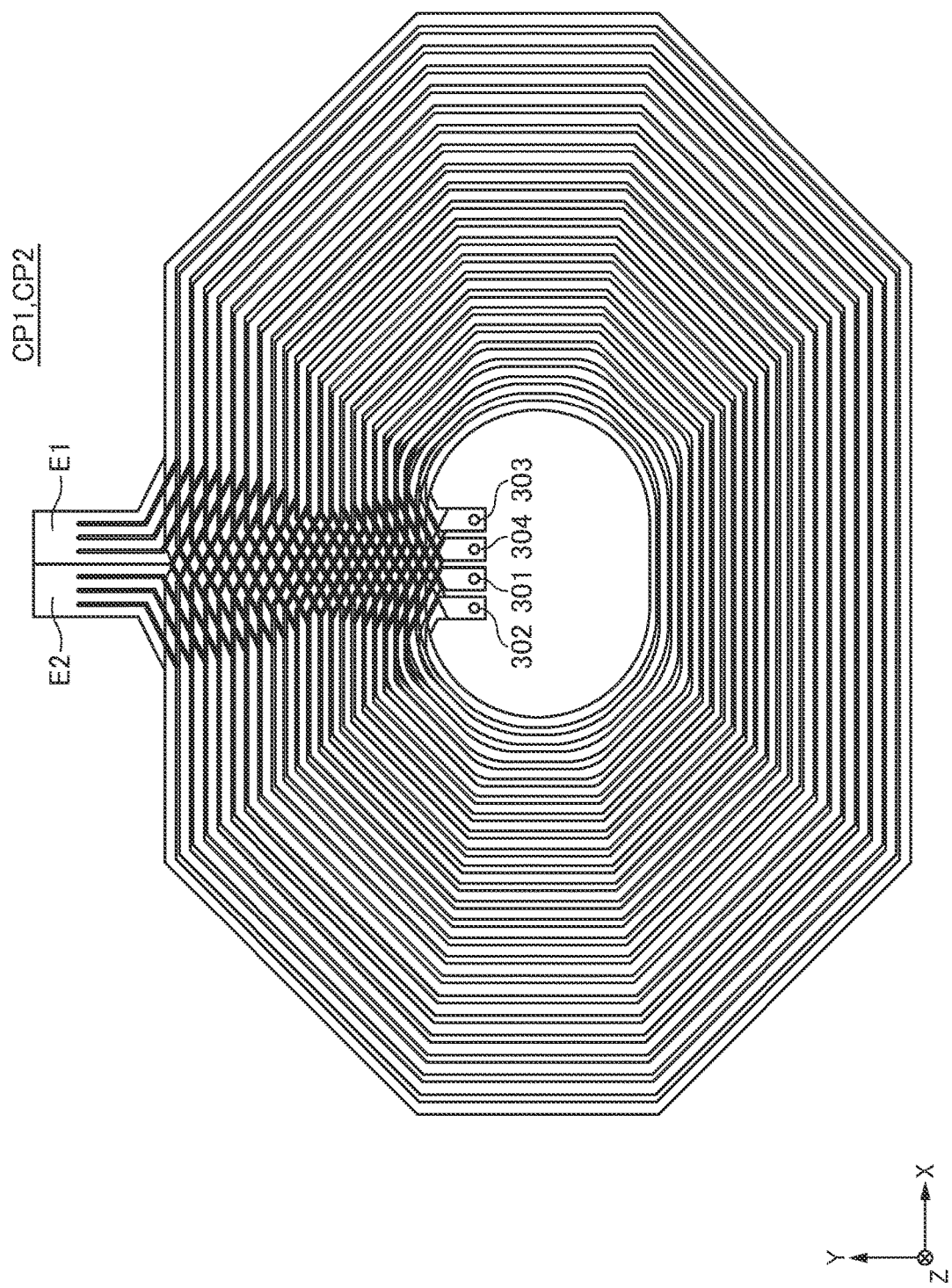
FIG. 12 is a schematic plan view illustrating a state where the first coil pattern CP1 illustrated in FIG. 10 and the second coil pattern CP2 illustrated in FIG. 11 overlap each other.

FIGS. 10 and 11 are schematic plan views illustrating the pattern shapes of the respective first and second coil patterns CP1 and CP2 according to a first modification. FIG. 12 is a schematic plan view illustrating a state where the first coil pattern CP1 illustrated in FIG. 10 and the 20 second coil pattern CP2 illustrated in FIG. 11 overlap each other.

The first and second coil patterns CP1 and CP2 according to the first modification has a substantially elliptical inner shape by gently curving the corner portions of the inner shape ID. This enhances the circularity of the inner shape ID, thereby further enhancing the peripheral uniformity of a magnetic field on the innermost turn.

Figure 13:
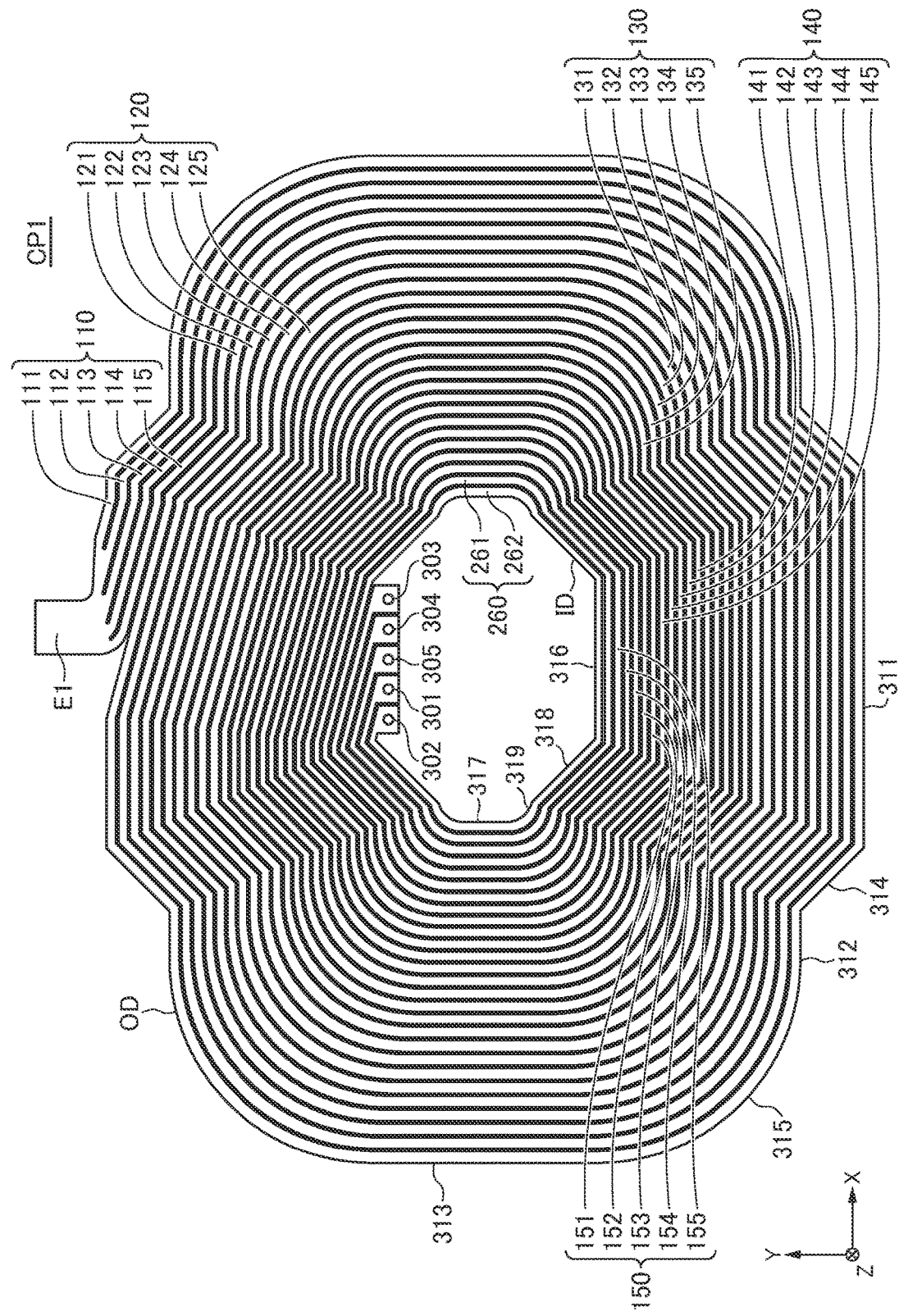
FIG. 13 is a schematic plan view illustrating the pattern shape of the first coil pattern CP1 according to a second modification.

FIG. 13 is a schematic plan view illustrating the pattern shape of the first coil pattern CP1 according to a second modification.

The first coil pattern CP1 according to the second modification illustrated in FIG. 13 differs from the first coil pattern CP1 illustrated in FIG. 6 in that the turns 110, 120, 130, 140, and 150 are radially divided into five by four spiral slits. Specifically, the turn 110 is divided into five lines 111 to 115, the turn 120 is divided into five lines 121 to 125, the turn 130 is divided into five lines 131 to 135, the turn 140 is divided into five lines 141 to 145, the turn 150 is divided into five lines 151 to 155, and the turn 160 is divided into two lines 161 and 162.

The lines 111, 121, 131, 141, 151, and 161 are continuous lines spirally wound in six turns and are each positioned at the outermost periphery in its corresponding turn. The lines 112, 122, 132, 142, 152, and 162 are continuous lines spirally wound in six turns and are each the second line counted from the outermost peripheral line in its corresponding turn. The lines 113, 123, 133, 143, and 153 are continuous lines spirally wound in five turns and are each the third line counted from the outermost peripheral line in its corresponding turn. The lines 114, 124, 134, 144, and 154 are continuous lines spirally wound in five turns and are each the second line counted from the innermost periphery in its corresponding turn. The lines 115, 125, 135, 145, and 155 are continuous lines spirally wound in five turns and are each positioned at the innermost periphery in its corresponding turn.

The outer peripheral ends of the lines 111 to 115 are connected in common to the first terminal electrode E1. The inner peripheral ends of the lines 161, 162, 153, 154, and 155 are connected respectively to through hole conductors 301 to 305 penetrating the substrate 101.

The outer shape OD of the first coil pattern CP1 has first and second sections 311 and 312 extending in the X-direction, a third section 313 extending in the Y-direction, a fourth section 314 positioned between the first and second sections 311 and 312 and extending obliquely with respect to the X-direction, and a fifth section 315 positioned between the second and third sections 312 and 313 and curved such that the extending direction thereof changes from the X-direction to the Y-direction. Specifically, there exist two first sections 311, two third sections 313, four second sections 312, four fourth sections 314, and four fifth sections 315. The boundaries between the fourth section 314 and the first and second sections 311 and 312 are not rounded but angular. The inner angles of the corner portions included in the outer shape OD are less than 180° except for the corner portion at the boundary between the second section 312 and the fourth section 314, and the inner angle of the corner portion between the second section 312 and the fourth section 314 exceeds 180°.

On the other hand, the inner shape ID of the first coil pattern CP1 has a sixth section 316 corresponding to the first section 311 and extending in the X-direction, a seventh section 317 corresponding to the third section 313 and extending in the Y-direction, an eighth section 318 corresponding to the fourth section 314 and extending obliquely with respect to the X-direction, and a ninth section 319 corresponding to the fifth section 315 and curved such that the extending direction thereof changes from the X-direction to the Y-direction. The boundary between the sixth section 316 and the eighth section 318 is not rounded but angular. The inner shape ID of the first coil pattern CP1 does not have a section corresponding to the second section 312, and thus the ninth section 319 is connected to the eighth section 318 not through a section extending in the X-direction. As a result, the circularity of the inner shape ID is higher than that of the outer shape OD. The inner angles of the corner portions included in the inner shape ID are less than 180° except for the corner portion at the boundary between the eighth section 318 and the ninth section 319, and the inner angle of the corner portion between the eighth section 318 and the ninth section 319 exceeds 180°.

Figure 14:
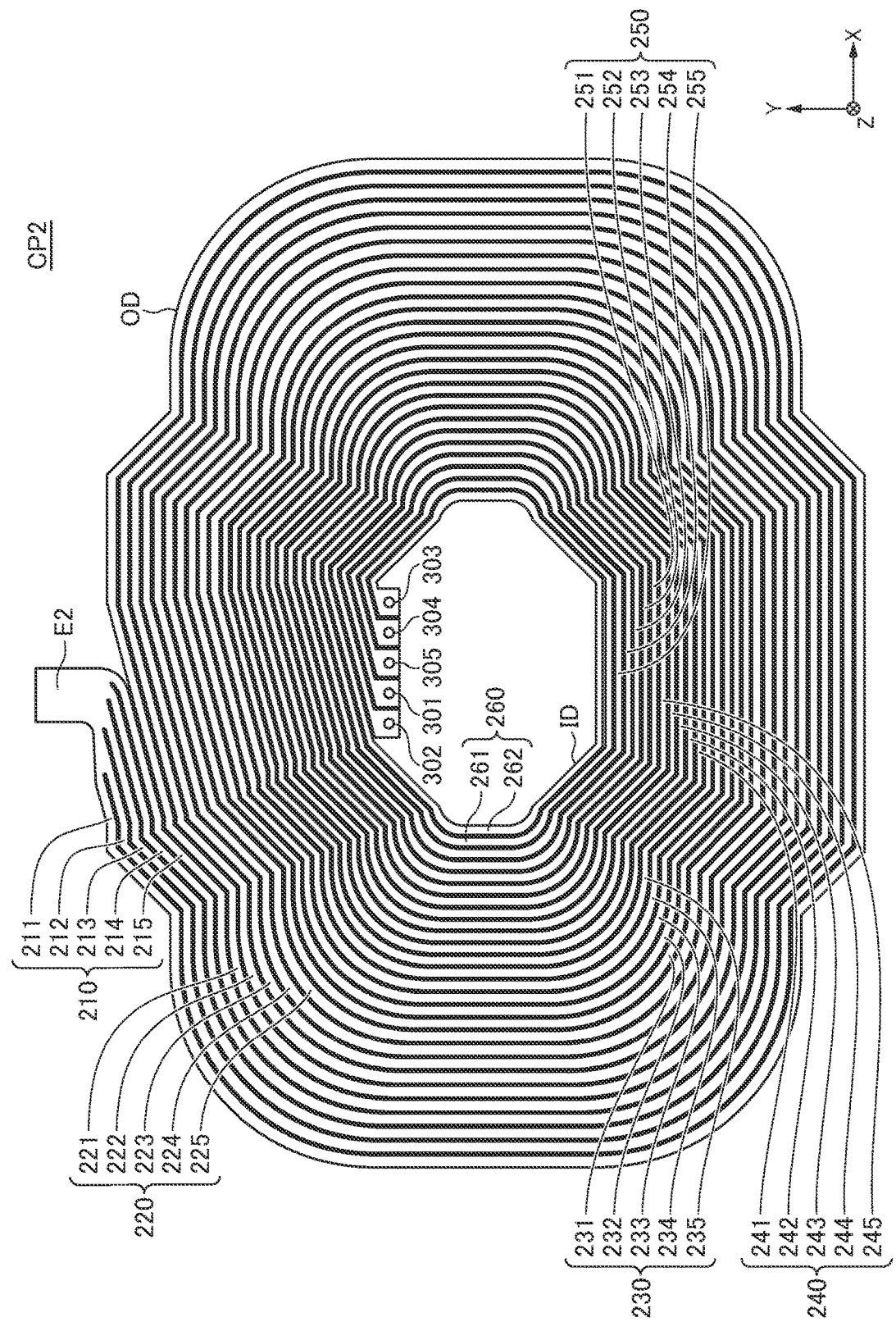
FIG. 14 is a schematic plan view illustrating the pattern shape of the second coil pattern CP2 according to the second modification.

FIG. 14 is a schematic plan view of the pattern shape of the second coil pattern CP2 according to the second modification, which illustrates a state viewed from the surface 101A side of the substrate 101 transparently through the substrate 101.

The second coil pattern CP2 has the same pattern shape as the first coil pattern CP1. However, the second coil pattern CP2 need not completely the same in shape as the first coil pattern CP1, and a difference in size due to manufacturing error or manufacturing convenience can be ignored. The second coil pattern CP2 has a six-turn configuration constituted of turns 210, 220, 230, 240, 250, and 260, in which the turn 210 and the turn 260 are positioned at the outermost periphery and at the innermost periphery, respectively. The turns 210, 220, 230, 240, and 250 are each radially divided into five by four spiral slits. The turn 260 is radially divided into two by one spiral slit. Specifically, the turn 210 is divided into five lines 211 to 215, the turn 220 is divided into five lines 221 to 225, the turn 230 is divided into five lines 231 to 235, the turn 240 is divided into five lines 241 to 245, the turn 250 is divided into five lines 251 to 255, and the turn 260 is divided into two lines 261 and 262.

The lines 211, 221, 231, 241, 251, and 261 are continuous lines spirally wound in six turns and are each positioned at the outermost periphery in its corresponding turn. The lines 212, 222, 232, 242, 252, and 262 are continuous lines spirally wound in six turns and are each the second line counted from the outermost peripheral line in its corresponding turn. The lines 213, 223, 233, 243, and 253 are continuous lines spirally wound in five turns and are each the third line counted from the outermost peripheral line in its corresponding turn. The lines 214, 224, 234, 244, and 254 are continuous lines spirally wound in five turns and are each the second line counted from the innermost periphery in its corresponding turn. The lines 215, 225, 235, 245, and 255 are continuous lines spirally wound in five turns and are each positioned at the innermost periphery in its corresponding turn.

The outer peripheral ends of the lines 211 to 215 are connected in common to the second terminal electrode E2. The inner peripheral ends of the lines 261, 262, 253, 254, and 255 are connected respectively to the through hole conductors 305, 304, 303, 302, and 301. As a result, four lines each having 11 turns and one line having 10 turns are connected in parallel between the first and second terminal electrodes E1 and E2. The second terminal electrode E2 may be provided on the surface 101A of the substrate 101. In this case, the outer peripheral ends of the lines 211 to 215 provided on the surface 101B of the substrate 101 are connected to the second terminal electrode E2 provided on the surface 101A of the substrate 101 through through hole conductors penetrating the substrate 101.

Figure 15:
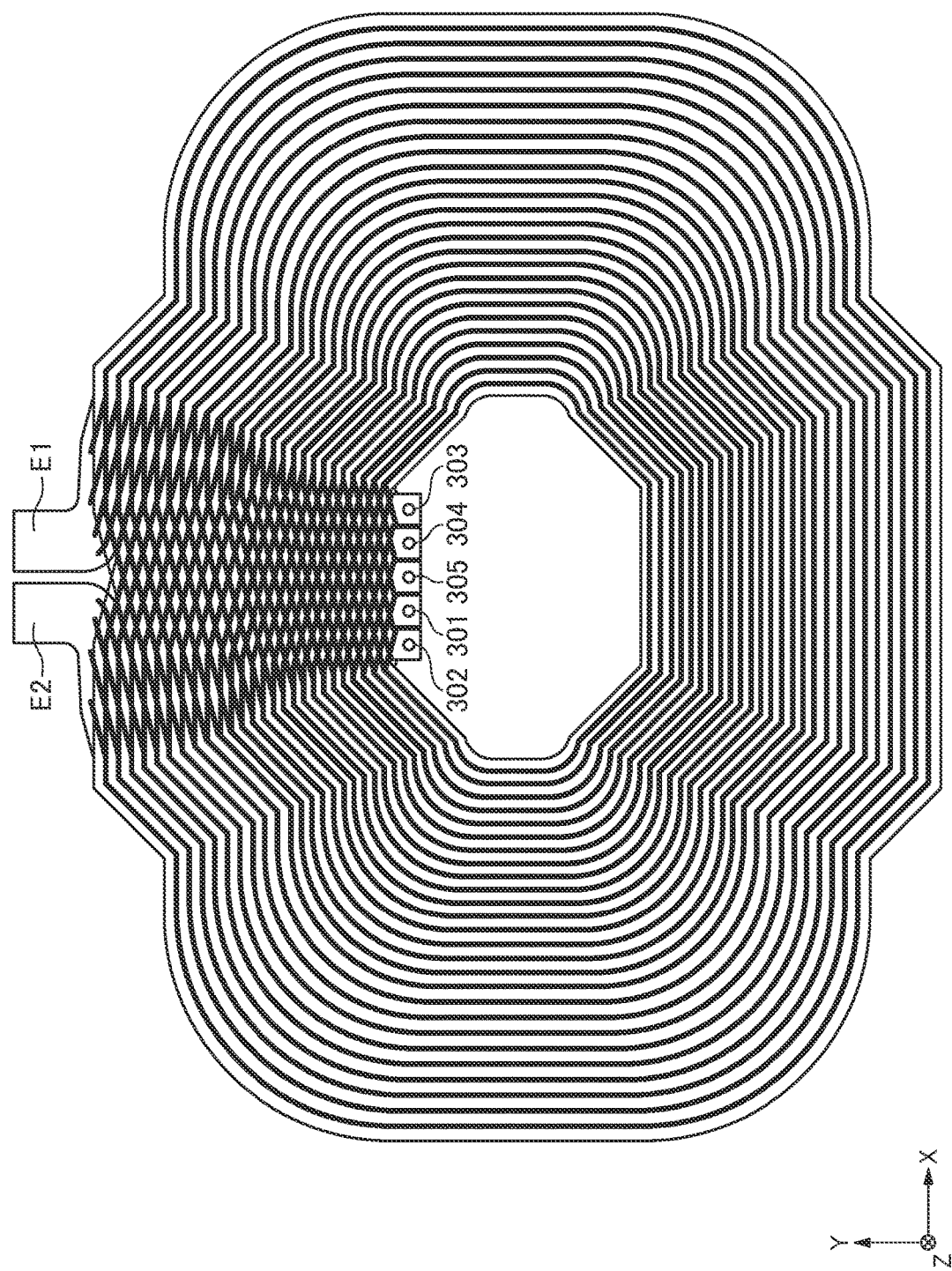
FIG. 15 is a schematic plan view illustrating a state where the first and second coil patterns CP1 and CP2 according to the second modification are made to overlap as viewed from the surface 101A side of the substrate 101.

FIG. 15 is a schematic plan view illustrating a state where the first and second coil patterns CP1 and CP2 according to the second modification are made to overlap as viewed from the surface 101A side of the substrate 101.

As illustrated in FIG. 15, in the second modification as well, the planar positions of the lines constituting the first coil pattern CP1 and the lines constituting the second coil pattern CP2 are substantially the same except for a transition area positioned between the first and second terminal electrodes E1, E2 and the through hole conductors 301 to 304. Further, the first and second terminal electrodes E1 and E2 are disposed adjacent to each other in the X-direction, facilitating connection thereof to the power transmission circuit 11 illustrated in FIG. 1.

As exemplified in the second modification, the inner shape ID and outer shape OD of the coil pattern may substantially differ in shape from each other. In the second modification, the outer shape OD of the first coil pattern CP1 has bent points where the lines are bent at the boundary between the first and fourth sections 311 and 314, at the boundary between the fourth and second sections 314 and 312, at the boundary between the second and fifth sections 312 and 315, and at the boundary between the fifth and third sections 315 and 313. The inner shape ID of the coil pattern CP1 has bent points where the lines are bent at the boundary between the sixth and eighth sections 316 and 318, at the boundary between the eighth and ninth sections 318 and 319, and at the boundary between the ninth and seventh sections 319 and 317. That is, in the second modification, the inner shape ID of the first coil pattern CP1 has a smaller number of the bent points than the outer shape OD of the first coil pattern CP1. As a result, the inner shape ID has a more rounded shape than the outer shape OD and thus has a circularity higher than that of the outer shape OD.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

A coil component according to the present disclosure includes a substrate and a planar spiral coil pattern provided on the surface of the substrate. The coil pattern has a circularity higher in its inner shape than in its outer shape. This makes it possible to provide a coil component capable of forming a magnetic field in a wide range and reducing a difference in magnetic field strength among peripheral direction positions of the opening area.

The circularity of the outer shape of the coil pattern may be higher than the circularity of a square. This makes it possible to achieve uniformity of magnetic field distribution outside the coil pattern.

The outer shape of the coil pattern may have first and second sections extending in a first direction, a third section extending in a second direction perpendicular to the first direction, a fourth section positioned between the first and second sections and extending obliquely with respect to the first direction, and a fifth section positioned between the second and third sections and curved such that the extending direction thereof changes from the first direction to the second direction. The inner shape of the coil pattern may have a sixth section corresponding to the first section and extending in the first direction, a seventh section corresponding to the third section and extending in the second direction, an eighth section corresponding to the fourth section and extending obliquely with respect to the first direction, and a ninth section corresponding to the fifth section and curved such that the extending direction thereof changes from the first direction to the second direction. The ninth section may be connected to the eighth section not through a section extending in the first direction. This makes it possible to further enhance the circularity of the inner shape.

The line width of the coil pattern may increase from the inner periphery to the outer periphery. This makes it possible to reduce a loss at the inner peripheral side where magnetic field strength is high and to reduce a DC resistance at the outer peripheral side where magnetic field strength is low.

The outer shape of the coil pattern may be larger in size in the first direction than in the second direction perpendicular to the first direction, and the line width in each turn of the coil pattern may be larger at a first position crossing a first virtual line extending in the first direction passing the center point of the coil pattern than at a second position crossing a second virtual line extending in the second direction passing the center point of the coil pattern. This makes it possible to reduce a DC resistance.

The line width of the coil pattern may increase, at the first position, stepwise a plurality of number of times from the inner periphery to the outer periphery, and may increase, at the second position, stepwise from the inner periphery to the outer periphery a number of times larger than the number of times of the increase at the first position. Thus, it is possible to adjust the relation between a loss and a DC resistance more finely at the second position having higher magnetic field strength than the first position.

The space width between the lines constituting the coil pattern may be larger at a third position crossing the first virtual line than at a fourth position crossing the second virtual line. This makes it possible to reduce a loss at the first position.

In each turn of the coil pattern, a difference between the line width at the first position and the line width at the second position may be smaller than a difference between the space width at the third position and the space width at the fourth position. This prevents an extreme variation in the line width in the same turn, thereby making it possible to reduce a DC resistance.

A wireless power transmission device according to the present disclosure includes the above-described coil component and a power transmission circuit connected to the coil component. Thus, even with displacement of the relative position between the coil component used as a power transmission coil and a power reception coil, magnetic coupling can be achieved. Further, magnetic coupling between the coil component used as a power transmission coil and the power reception coil in the absence of displacement of the relative position therebetween can be enhanced.

What is claimed is:

1. A coil component comprising:
a substrate; and
a planar spiral coil pattern provided on a surface of the substrate,
wherein the coil pattern has a circularity higher in its inner shape than in its outer shape,
wherein the outer shape of the coil pattern has first and second sections extending in a first direction, a third section extending in a second direction perpendicular to the first direction, a fourth section positioned between the first and second sections and extending obliquely with respect to the first direction, and a fifth section positioned between the second and third sections and curved such that the extending direction thereof changes from the first direction to the second direction,
wherein the inner shape of the coil pattern has a sixth section corresponding to the first section and extending in the first direction, a seventh section corresponding to the third section and extending in the second direction, an eighth section corresponding to the fourth section and extending obliquely with respect to the first direction, and a ninth section corresponding to the fifth section and curved such that the extending direction thereof changes from the first direction to the second direction, and wherein the ninth section is connected to the eighth section not through a section extending in the first direction.

2. The coil component as claimed in claim 1, wherein a circularity of the outer shape of the coil pattern is higher than a circularity of a square.

3. The coil component as claimed in claim 1, wherein a line width of the coil pattern increases from an inner periphery to an outer periphery.

4. The coil component as claimed in claim 3,
wherein the outer shape of the coil pattern is larger in size in a first direction than in a second direction perpendicular to the first direction, and
wherein the line width in each turn of the coil pattern is larger at a first position crossing a first virtual line extending in the first direction passing a center point of the coil pattern than at a second position crossing a second virtual line extending in the second direction passing the center point of the coil pattern.

5. The coil component as claimed in claim 4,
wherein the line width of the coil pattern increases, at the first position, stepwise a plurality of number of times from the inner periphery to the outer periphery, and
wherein the line width of the coil pattern increases, at the second position, stepwise from the inner periphery to the outer periphery a number of times larger than the number of times of an increase at the first position.

6. The coil component as claimed in claim 4, wherein a space width between the lines constituting the coil pattern is larger at a third position crossing the first virtual line than at a fourth position crossing the second virtual line.

7. The coil component as claimed in claim 6, wherein, in each turn of the coil pattern, a difference between the line width at the first position and the line width at the second position is smaller than a difference between the space width at the third position and the space width at the fourth position.

8. The coil component as claimed in claim 1, further comprising a power transmission device connected to the coil pattern.

9. A coil component comprising:
a substrate; and
a planar spiral coil pattern provided on a surface of the substrate,
wherein the coil pattern has a circularity higher in its inner shape than in its outer shape,
wherein a line width of the coil pattern increases from an inner periphery to an outer periphery,
wherein the outer shape of the coil pattern is larger in size in a first direction than in a second direction perpendicular to the first direction, and
wherein the line width in each turn of the coil pattern is larger at a first position crossing a first virtual line extending in the first direction passing a center point of the coil pattern than at a second position crossing a second virtual line extending in the second direction passing the center point of the coil pattern.

10. The coil component as claimed in claim 9,
wherein the line width of the coil pattern increases, at the first position, stepwise a plurality of number of times from the inner periphery to the outer periphery, and
wherein the line width of the coil pattern increases, at the second position, stepwise from the inner periphery to the outer periphery a number of times larger than the number of times of an increase at the first position.

11. A coil component comprising:
a substrate; and
a planar spiral coil pattern provided on a surface of the substrate,
wherein the coil pattern has a circularity higher in its inner shape than in its outer shape,
wherein a line width of the coil pattern increases from an inner periphery to an outer periphery, and
wherein a space width between the lines constituting the coil pattern is larger at a third position crossing a first virtual line extending in the first direction passing a center point of the coil pattern than at a fourth position crossing a second virtual line extending in the second direction passing the center point of the coil pattern.

12. The coil component as claimed in claim 11, wherein, in each turn of the coil pattern, a difference between the line width at a first position crossing the first virtual line and the line width at a second position crossing the second virtual line is smaller than a difference between the space width at the third position and the space width at the fourth position.

* * * * *